United States Patent [19]

Hains

[11] Patent Number: 4,464,353

[45] Date of Patent: Aug. 7, 1984

[54] QUICKLIME SLAKING PROCESS

[75] Inventor: Norman L. Hains, Houston, Tex.

[73] Assignee: Chemlime Corporation, N.J.

[21] Appl. No.: 550,501

[22] Filed: Nov. 9, 1983

Related U.S. Application Data

[63] Continuation of Ser. No. 390,397, Jun. 21, 1982, abandoned.

[51] Int. Cl.$^3$ .............................................. C01F 11/02
[52] U.S. Cl. ...................................................... 423/640
[58] Field of Search ......................................... 423/640

[56] References Cited

U.S. PATENT DOCUMENTS

| | | | |
|---|---|---|---|
| 783,570 | 2/1905 | Ellis et al. | 423/640 |
| 1,277,855 | 9/1918 | Carson. | |
| 1,579,766 | 4/1926 | Hite | 423/640 |
| 1,664,598 | 4/1928 | Dittlinger. | |
| 2,044,553 | 6/1936 | Welch | 423/640 |
| 4,233,015 | 11/1980 | Teague et al. | 405/263 |
| 4,329,090 | 5/1982 | Teague et al. | 405/263 |

OTHER PUBLICATIONS

Boynton Chemistry and Technology of Lime and Limestone, (1966), Interscience Publishers, pp. 290, 291.

*Primary Examiner*—John Doll
*Assistant Examiner*—Wayne A. Langel
*Attorney, Agent, or Firm*—Leydig, Voit, Osann, Mayer & Holt, Ltd.

[57] ABSTRACT

A method for forming a lime slurry in which a sulfate compound is mixed with an aqueous slaking medium and in which the resulting sulfate/water mixture is admixed with calcium oxide.

5 Claims, No Drawings

QUICKLIME SLAKING PROCESS

This application is a continuation of application Ser. No. 390,397, filed June 21, 1982 now abandoned.

BACKGROUND OF THE INVENTION

1. Field of the Invention

The present invention relates to a method for forming a lime slurry. In particular, through the timely addition of sulfate compounds to a slaking medium, the slaking requirement for the lime slurry is substantially reduced, thereby reducing handling costs without adversely affecting the quality or characteristics of the lime slurry.

2. Description of the Prior Art

Slurries of hydrated lime derived from calcium oxide are frequently used for soil stabilization, acid neutralization, waste treatment, water treatment and various other industrial processes. In the past, dry hydrated lime powder has been the predominent, on-site material employed for these purposes. Dry hydrated lime powder is produced by adding water to quicklime in sufficient quantities to satisfy only the chemical requirement to yield calcium hydroxide. The resultant product is a finely divided, dry powder which is transported to the ultimate use site where it is mixed with water to form a lime slurry for actual application. The dry hydrate powder form is better-suited than quicklime for on-site handling due to safety considerations.

As an alternative to dry hydrated lime powder, lime slurry is gaining acceptance as a delivered, on-site product. Lime slurry is produced by hydrating quicklime without the intermediate dry hydrated lime product. Thus, direct production of a lime slurry from quicklime eliminates the expensive dry hydrating phase. When quicklime is converted directly to a lime slurry by prior art lime slurry processes, however, the solids concentration of the slurry is only about thirty percent dry weight. Since lime slurry is sold, delivered and used on a volume of solids basis, transportation and handling costs are substantially increased over equivalent costs for the dry product.

SUMMARY OF THE INVENTION

In accordance with the present invention it has been found that, in the production of a lime slurry, the timely addition of sulfate compounds, preferably calcium sulfate, to the aqueous slaking medium prior to the introduction of calcium oxide (quicklime) retards the chemical reaction of the calcium oxide with the aqueous slaking medium, thereby forming a lime slurry having decreased solubility and increased particle agglomeration.

While not affecting the chemical characteristics of the lime slurry formed in the reaction, the process of this invention affects the physical properties of the lime slurry formed by allowing the formation of larger crystals of calcium hydroxide and thus increasing the average particle size by agglomeration. If the sulfate compound is not added, the average particle size of the lime generated is very small.

Since the effect of increasing average particle size and decreasing particle wettable surface area causes a significant decrease in viscosity of the lime suspension per unit volume, the lime solids content may be maximized while maintaining good flowability and pumpability. Without the process of the present invention, solids must be kept in the 20% to 30% solids concentration (dry weight) range to maintain flowability. A solids concentration of greater than 32% in the prior art processes creates a mass with a consistency of paste, putty or gel which is not pumpable or flowable.

Thus, it is the principal object of the present invention to produce a high density lime slurry in the direct conversion of quicklime to lime slurry.

DESCRIPTION OF THE PREFERRED EMBODIMENTS

In the preferred embodiment of the present invention, useful sulfate compounds have been found to include alkali metal and alkaline earth metal sulfates (e.g., potassium sulfate, calcium sulfate and sodium sulfate), organic sulfates (e.g., lignin sulfate), and sulfuric acid. In the most preferred embodiment, calcium sulfate is preferably added to the slaking medium in an amount ranging from about 0.5% to 5%, preferably about 1.0% to 2.0% and most preferably about 1.64% measured as a dry weight percent of the quicklime to be slaked.

In the preferred embodiment of the present discovery, a tank is filled with an aqueous slaking medium, preferably water, to a predetermined level. A soluble sulfate compound is added to the tank at a predetermined rate. The sulfate/slaking medium solution in the tank is then fed into a reactor. At the same time, quicklime is fed into the reactor. The sulfate/slaking medium solution and quicklime are allowed to react in the reactor for a predetermined period of time or until a predetermined temperature, preferably in the range of about 180° F. to 220° F., most preferably about 212° F., is reached. The resulting lime slurry can then be pumped out of the reactor and transported to the use site or preferably pumped to cooling and settling ponds where it remains indefinitely with no degradation of the product.

EXAMPLE 1

Calcium sulfate is added to a water filled tank in an amount equal to 1.64 percent by dry weight of the quicklime to be slaked. The resulting sulfate/water solution is fed to a reactor which simultaneously receives quicklime. When the temperature of the reactants in the reactor reaches 212° F., the lime slurry formed by the reaction of the sulfate/water solution with the quicklime is fed into a settling pond where it more completely hydrates for six days. Thereafter, it is pumped out of the pond and transported to the use site.

EXAMPLE 2

Potassium sulfate is added to a water filled tank in an amount equal to 0.25 percent by dry weight of the quicklime to be slaked. The resulting sulfate/water solution is fed to a reactor which simultaneously receives quicklime. When the temperature of the reactants in the reactor reaches 212° F., the lime slurry formed by the reaction of the sulfate/water solution with the quicklime is pumped out of the reactor and transported to the use site.

EXAMPLE 3

Sodium sulfate is added to a water filled in an amount equal to 0.125 percent by dry weight of the quicklime to be slaked. The resulting sulfate/water solution is fed to a reactor which simultaneously receives quicklime. When the temperature of the reactants in the reactor reaches 212° F., the lime slurry formed by the reaction of the sulfate/water solution with the quicklime is fed into a settling pond where it more completely hydrates for six days. Thereafter, it is pumped out of the pond and transported to the use site.

I claim:

1. In the method for hydrating calcium oxide with an aqueous slaking medium to form a lime slurry, the improvement comprising the step of adding a soluble sulfate compound to the slaking medium prior to contacting the calcium oxide with the slaking medium, and then contacting the calcium oxide with the slaking medium to directly form a flowable and pumpable lime slurry having a solids content greater than 32% by weight.

2. A method, according to claim 1, wherein the aqueous slaking medium comprises water.

3. A method, according to claim 1, wherein the soluble sulfate compound comprises a member selected from the group consisting of alkali metal and akaline earth sulfates, organic sulfates, sulfuric acid and mixtures thereof.

4. A method, according to claim 3, wherein the member comprises calcium sulfate.

5. A method, according to claim 4, wherein the calcium sulfate is added to the aqueous slaking medium in an amount ranging from about 0.5 percent to about 5 percent dry weight of the calcium oxide.

* * * * *